United States Patent [19]

Takishima

[11] Patent Number: 5,379,416

[45] Date of Patent: Jan. 3, 1995

[54] STATE TRACER SYSTEM

[75] Inventor: Tohru Takishima, Tokyo, Japan

[73] Assignee: NEC Corporation, Tokyo, Japan

[21] Appl. No.: 980,255

[22] Filed: Nov. 23, 1992

[30] Foreign Application Priority Data

Nov. 22, 1991 [JP] Japan ................................ 3-332738

[51] Int. Cl.6 ........................ G06F 11/34; G11C 29/00
[52] U.S. Cl. ..................................... 395/575; 371/21.1
[58] Field of Search ........................ 371/16.5, 12, 16.1,
371/16.4, 19, 18, 51.1, 49.3, 68.3, 40.2, 2.2, 10.1,
21.1; 395/575, 275, 500, 550; 364/221, 221.7,
232.8, 240, 278, 267.4

[56] References Cited

U.S. PATENT DOCUMENTS

| | | | |
|---|---|---|---|
| 4,380,058 | 4/1983 | Wakai | 365/244 |
| 4,636,940 | 1/1987 | Goodwin, Jr. | 371/19 |
| 4,777,636 | 10/1988 | Yamashita et al. | 371/43 |
| 5,056,013 | 10/1991 | Yamamoto | 371/16.2 |
| 5,058,114 | 10/1991 | Kuboki et al. | 371/16.5 |
| 5,127,103 | 6/1992 | Hill et al. | 395/575 |
| 5,146,586 | 9/1992 | Nakano | 395/575 |
| 5,251,227 | 10/1993 | Bruckert et al. | 371/12 |

Primary Examiner—Robert W. Beausoliel, Jr.
Assistant Examiner—Dieu-Minh Le
Attorney, Agent, or Firm—Sughrue, Mion, Zinn, Macpeak & Seas

[57] ABSTRACT

A state tracer system comprising a counter for counting the time taken until, upon receipt of a first request signal from a storage unit, an error takes place; an A-register within which the count number A of this counter is set and its state is held; an X-register which allows the time taken to reach the necessary data to be arbitrarily set; an A-subtracting circuit for subtracting the count number A held by the A-register and the count number X held by the X-register to emit (A - X); a comparator for comparing the output value (A - X) of the A-subtracting circuit and the outpost value of the counter; and means for entering the output (A - X) from the comparator to a stop condition circuit of the tracer memory as a stop signal so that, by setting the count number X of the X-register to several tens to hundreds of micorseconds. Therefore, it is possible to collect the trace data traced back to several tens to hundreds of microseconds before the time the error takes place and the stop condition is met, without increasing the storage capacity of the RAM of the tracer memory.

3 Claims, 3 Drawing Sheets

F I G. 3
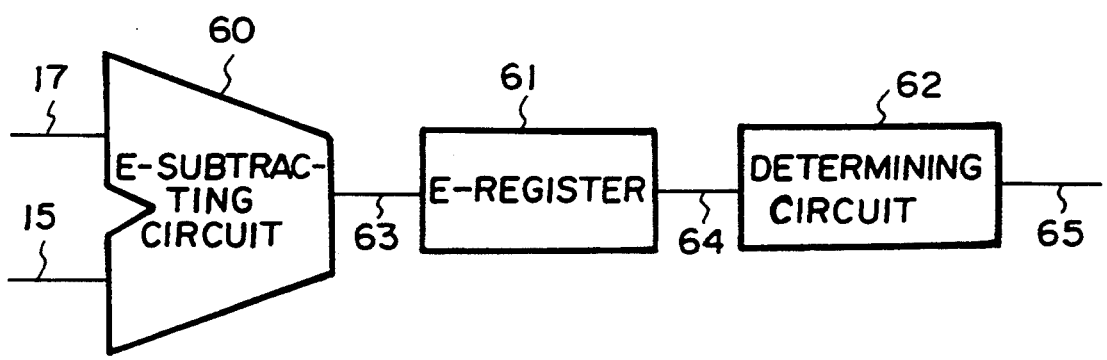

STATE TRACER SYSTEM

BACKGROUND OF THE INVENTION

The present invention relates to a state tracer system which allows tracing data before the stop condition of a tracer memory is met to be collected.

In a general tracer memory as shown in FIG. 1, when it is in the running condition, an address 43 of a RAM 31 is counted up by an address counter comprising an arithmetic operation circuit 33 and a register 34. Meanwhile, write data 40 is entered to the RAM 31 via a register 30. Further, since the stop condition of a write pulse 48 is not met, it is entered to the RAM 31. Therefore, data 40 is written into the RAM 31 for each clock.

In the tracer memory mentioned as above, if a stop signal 51 is entered to a stop condition circuit 35 as some error occurs, then the stop condition is met, and the count up of address 43 is suppressed, while a write pulse 47 fed to the RAM 31 via an AND 36 is suppressed. In this stop condition, the address 42 is entered to the arithmetic operation circuit 33 so that data 50 are read out of the RAM 31 via the register 32. If the address 42 is counted up starting from zero (0), then the data present prior to the time when the stop condition is met is sequentially read out.

In such a tracer memory, the history of the trace data which is obtained at the time the stop condition is met has been limited to ones which can be traced back to several micorseconds before because the storage capacity of the RAM is limited, which has made it impossible to collect those traced back to several tens to hundreds of microseconds before the time the stop condition is met.

SUMMARY OF THE INVENTION

Accordingly, an object of the present invention is to provide a state tracer system which allows the trace data present several tens to hundreds of microseconds before time the stop condition is met, without increasing the storage capacity of the RAM.

According to the present invention, there is provided a state tracer system incorporated within a storage unit for tracing various signals present therein, comprising:
a state tracer system comprising a register for holding a first request signal received from said storage unit;
a counter to which the output signal from said register is entered and, for, when there is no error within said storage unit, being incremented for each clock and, for, when there is any error, being suppressed from being incremented;
an A-register for initially setting the output value of said counter for each clock and, after any error takes place within said storage, being set or held according to the condition;
an X-register whose value may be arbitrarily set according to the shift-in operation; and an A-subtracting circuit to which the output values of said A and X-registers are each entered for subtraction;
a comparator for comparing the output value of said A-subtracting circuit and the output value of said counter; and
means for entering the output from said comparator to a stop condition circuit of said tracer memory.

In a preferred embodiment of the present invention, the state tracer system further comprises an E-subtracting circuit to which the output values of the A-register and the counter are entered for subtraction; an E-register for setting the output signal from the E-subtracting circuit and a determining circuit for determining whether the output value of the E-register is positive, zero or negative.

That is, the state tracer system according to the present invention has an advantage that, with the time the request is received from the storage unit taken as the reference, the count number with which the error within the storage unit occurs and the count number up to which the data is to be traced back are arithmetically operated so that the data traced back to several tens or hundreds of microseconds before the stop condition is met can readily be collected without increasing the storage capacity of the RAM at all.

The present invention will be described in more detail with reference to the accompanying drawings.

BRIEF DESCRIPTION OF THE DRAWINGS

FIG. 3 is a block diagram of another state tracer system embodying the present invention.

DESCRIPTION OF THE PREFERRED EMBODIMENTS

A method for collecting data which may be traced back up to several tens to hundreds of microseconds before an error takes place within a storage unit and the stop condition is met is as follows. A period of time taken until, upon receipt of a first request from the storage unit, the error takes place and the stop condition is met is previously set to the A-register. Next, a period of time taken to reach the preceding intended data as counted back from the time the stop condition is set to the X-register. If the storage unit is started from the first again, then the data traced back to several tens to hundreds of $\mu$s before the time the stop condition has subsisted is collected and the tracer memory is stopped. The foregoing operation will be specifically described below.

Figure 2:
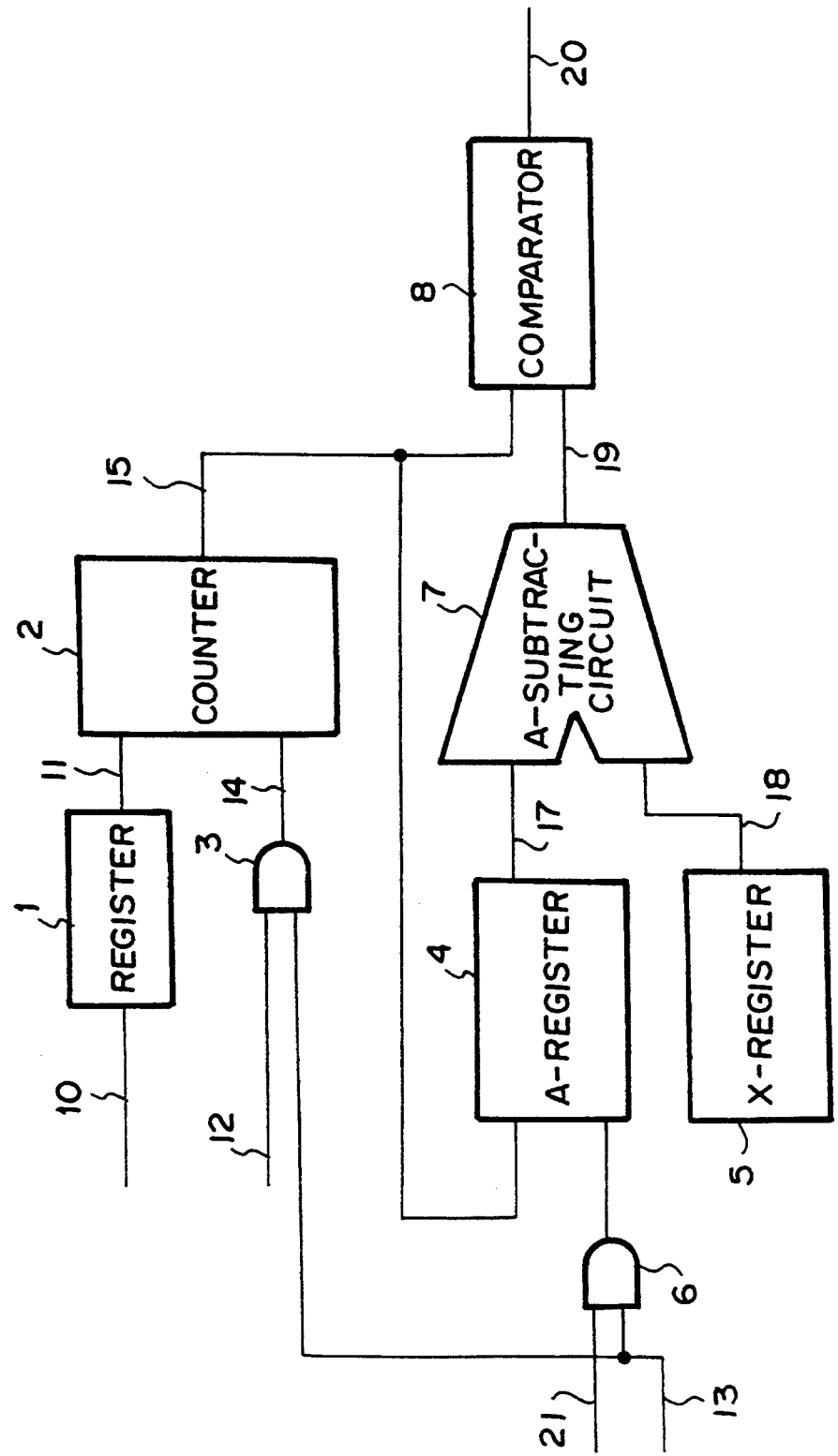
FIG. 2 is a block diagram of a state tracer system embodying the present invention.

With reference to FIG. 2, request signal 10 within the storage unit is entered and a register 1 is held to the logic "1". As a result, a counter 2 is incremented for each clock, and its count number is set to an A-register 4. At this time, if an error occurs within the storage unit, then, since an error signal 12 is turned into the logic "0" and a clock 13 is not supplied from an AND 3 to the counter 2, the counter 2 is suppressed from being incremented. Therefore, a time (count number A) taken until, upon receipt of the request 10, the error takes place is set to the A-register 4.

Figure 1:
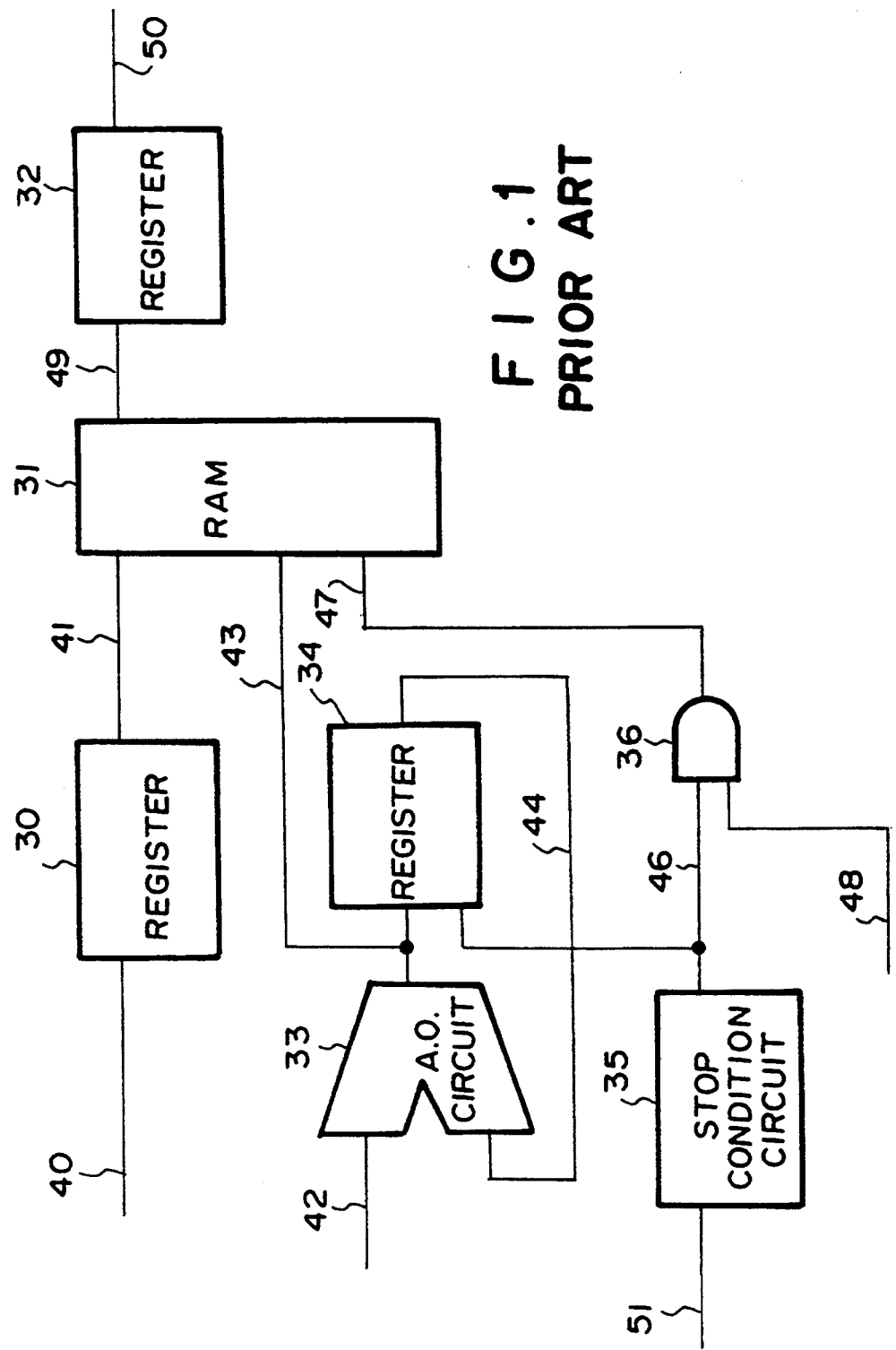
FIG. 1 is a block diagram of a conventional tracer memory.

Next, the count number X is set to the X-register 5 by the shift-in operation. When the operation of the storage unit is started from the start in this state, the counter 2 is incremented from "0". If, at this time, a hold signal 21 which can arbitrarily be set is the logic "0", then the value of the A counter is held to A, and the value of the counter 2 is not set. Therefore, the output value 19 of the A-subtracting circuit 7 results in (A - X). When the value 15 of the counter 2 becomes (A - X), the output 20 of a comparator 8 becomes the logic "1". In case that the signal 20 is entered to a stop condition circuit 35 of the tracer memory of FIG. 1 in the same manner as in the input signal 51, then the tracer memory is stopped.

At this time, the trace data of the RAM 31 belongs to ones traced back the count number X before the time the stop condition is met by the occurrence of the error of the storage unit. If the count number X is set to from several tens to hundreds of μs, then the data preceding this point can be collected.

FIG. 3 illustrates another embodiment, in which even after signals 15 and 19 coincide with each other within the comparator 8, as shown in FIG. 2, the counter 2 is further incremented until the error signal 12 takes place to stop with the count number A. However, if the condition in which the error takes place within the storage unit is changed, the counter 2 cannot stop with the count number A, or the count number A cannot be reached, or the count number (A - X) cannot be reached. Therefore, the value 17 of the A-register 4 and the value 15 of the counter 2 as the counter 2 stops are entered to an E-subtracting circuit 60 for subtraction. The subtracted value 63 is set to the E-register 61 and is further entered to a determining circuit 62 so that the condition in which the error takes place within the storage unit can be determined.

What is claimed is:

1. A state tracer system incorporated within a storage unit for tracing various signals present therein, having a stop condition circuit and comprising:
    a register for holding a first request signal received from said storage unit;
    a counter provided to receive an output signal from said register to perform counting for each clock when there is no error within said storage unit, and to stop counting when there is any error within said storage unit;
    an A-register for holding a time (A) from the first request signal to an occurrence of the error;
    an X-register for setting a desired time (X) to be traced preceding the occurrence of the error;
    a subtracting circuit for calculating a time (A - X) to start tracing;
    a comparator for comparing outputs of said subtracting circuit and the counter; and
    means for entering the output from said comparator to a stop condition circuit of said state tracer.

2. The state tracer system as set forth in claim 1 which further comprises:
    an E-subtracting circuit to which the output values of said A-register and said counter are entered for subtraction;
    an E-register for setting the output signal of said subtracting circuit; and
    a determining circuit for determining whether the output value of said E-register is positive, zero or negative.

3. A state tracer system incorporated within a storage unit for tracing various signals present therein, having a stop condition circuit and comprising:
    a register for holding a first request signal received from said storage unit;
    a counter provided to receive an output signal from said register to perform counting for each clock when there is no error within said storage unit, and to stop counting when there is any error within said storage unit;
    an A-register for holding the time (A) defined by the counting of said counter;
    an X-register for setting a desired time (X) to be traced preceding an occurrence of the error;
    a subtracting circuit for calculating a time (A-X) to start tracing;
    a comparator for comparing outputs of the subtracting circuit and the counter; and
    means for entering the output from said comparator to a stop condition circuit of said state tracer.

* * * * *